United States Patent [19]

Schneider

[11] Patent Number: 5,064,036
[45] Date of Patent: Nov. 12, 1991

[54] ADAPTIVE TORIONAL DAMPING DEVICE FOR A CONTINUOUSLY VARIABLE TRANSMISSION

[75] Inventor: Karl F. Schneider, Ithaca, N.Y.

[73] Assignee: Borg-Warner Automotive, Inc., Sterling Heights, Mich.

[21] Appl. No.: 528,291

[22] Filed: May 24, 1990

[51] Int. Cl.$^5$ .................. F16D 7/02; F16D 25/14
[52] U.S. Cl. ..................... 192/0.032; 192/0.076; 192/103 F
[58] Field of Search ............ 192/0.032, 0.034, 0.076, 192/3.58, 30 V, 54, 55, 103 F

[56] References Cited

U.S. PATENT DOCUMENTS

| | | | |
|---|---|---|---|
| 4,428,467 | 1/1984 | Hiramatsu | 192/3.58 X |
| 4,433,594 | 2/1984 | Smirl | 475/206 |
| 4,457,411 | 7/1984 | Hiramatsu | 192/0.076 |
| 4,466,311 | 8/1984 | Hiramatsu | 192/3.58 X |
| 4,606,446 | 8/1986 | Watanabe | 192/0.076 |
| 4,668,773 | 5/1987 | Hiramatsu et al. | 74/866 |
| 4,674,609 | 6/1987 | Sturges et al. | 192/0.076 X |
| 4,715,482 | 12/1987 | Watanabe et al. | 192/0.032 |
| 4,724,939 | 2/1988 | Lockhart et al. | 192/103 F X |
| 4,757,886 | 7/1988 | Brown et al. | 192/103 F X |
| 4,793,454 | 12/1988 | Petzold et al. | 192/0.032 |

Primary Examiner—Richard Lorence
Attorney, Agent, or Firm—Hugh A. Abrams; Greg Dziegielewski

[57] ABSTRACT

An adaptive control system controls the slip across a start clutch located up-stream of a continuously variable transmission to allow the clutch to be use as a torsional isolator in a continuously variable transmission. The system includes a torsional vibration detector for determining the actual level of torsional vibrations transmitted by the clutch. The actual level of vibrations is compared with an acceptable level and the slip across the clutch is regulated in order to maintain the transmission of vibrations to the acceptable level.

11 Claims, 1 Drawing Sheet

ADAPTIVE TORIONAL DAMPING DEVICE FOR A CONTINUOUSLY VARIABLE TRANSMISSION

BACKGROUND OF THE INVENTION

1. Field of the Invention

This invention relates to a continuously variable transmission (CVT) in which a slippable start clutch is utilized as an active torsional damping device. More particularly, this invention relates to a simplified adaptive control system that reduces torsional vibrations in the CVT to an acceptable level by measuring torsional vibrations at the clutch output shaft.

2. Description of the Prior Art

A continuously variable transmission system utilizes a pair of adjustable pulleys, including a primary pulley and a secondary pulley. Each pulley has at least one sheave that is axially fixed and another sheave that is axially movable relative to the first. A flexible belt of metal or elastomeric material interconnects the pulleys. The inner faces of the sheaves of the pulley are bevelled or chamfered so that as the axially displaceable sheave moves relative to the fixed sheave, the distance between the sheaves and, thus, the effective pulley diameter may be adjusted. The primary pulley is driven by an engine and the output of the secondary pulley drives the drive train of the vehicle. The drive train is typically connected to the secondary pulley through a clutch.

The displaceable sheave of each pulley includes a fluid constraining chamber for receiving fluid to move the sheave and thus change the effective pulley diameter. Increasing the fluid in the chamber increases the effective diameter of the pulley. As fluid is exhausted from the chamber, the pulley diameter decreases. Generally the effective diameter of the primary pulley is moved in one direction as the effective diameter of the secondary pulley is moved in the other.

The movement of the sheave of the primary pulley servo regulates the transmission ratio across the CVT. The hydraulic pressure of the sheave of the secondary pulley servo varies the clamping force on the belt connecting the primary and secondary pulleys. U.S. Pat. No. 4,433,594, entitled "Variable Pulley Transmission", provides further information in relation to CVTs and is incorporated herein by reference in terms of background to the present invention.

Engines that drive continuously variable transmissions, especially reciprocating engines, tend to produce torque fluctuations that lead to torsional vibrations on the input shaft of the belt and sheave system. It is important to the smooth operation of the continuously variable transmission that such torsional vibrations are kept within acceptable limits.

The manner in which vibrations are reduced or dampened is dependent, in part, on the location of the different elements of the CVT. In a system such as that described in U.S. Pat. No. 4,433,594, which includes a slippable start clutch downstream of the belt and sheave system, a long travel damper is generally located upstream of the belt and sheave system to damp start-up, shut-down and drive mode vibrations, thereby preventing transmission of such vibrations to the belt and sheave system. In a continuously variable transmission having a start clutch positioned up-stream of the belt and sheave system, the larger torsional vibrations experienced during start-up and shut-down are not transmitted as a result of the slip between the clutch plates. This is to some extent a by-product of clutch control primarily aimed at ensuring that torque transmitted to the belt and sheave system increases or decreases smoothly during start-up and shut-down, respectively. Once the transmitted torque has attained the required level, the clutch is locked. A short travel mechanical damper is generally located upstream of the belt and sheave system to damp the vibrations experienced during clutch lock-up.

U.S. Pat. No. 4,665,773, entitled "Continuously Variable Transmission Apparatus for Automobile", describes an alternative configuration of a CVT which includes a wet start clutch positioned up-stream of the belt and sheave system. A control system regulates the hydraulic circuit that controls slip across the start clutch. During the drive mode, the clutch is substantially locked to allow selected slip in accordance with signals from the control unit. Empirically collected data is used to provide information on the level of vibrations likely to be experienced by the continuously variable transmission for a range of engine conditions defined in terms of a set of engine parameters. These parameters include the degree of opening of the throttle valve, the engine torque and the engine speed. For a given set of measured engine parameters the probable level of vibration experienced by the continuously variable transmission is determined and a requisite amount of slip to remove that level of vibration is calculated. The clutch slippage is regulated by operation of a hydraulic fluid circuit.

The present invention avoids the need for empirical data by providing an adaptive system to control the slip in the start clutch.

SUMMARY OF THE INVENTION

The present invention provides a simplified and effective control system for a slippable start clutch in a continuously variable transmission system. The system adapts to the requirements of the engine by avoiding slip below a specified level of vibration and by providing varying levels of slip when the vibrations are greater than an acceptable level. The system avoids the need for empirically derived data other than that data necessary to establish the acceptable level of torsional vibration. None of the memory storage available in the control system needs to be utilized to store data for achievement of active damping.

The adaptive nature of the system of this invention allows the engine to damp vibrations that occur as a result of circumstances that may not be taken into account in a system that relies upon empirically collected data. It also allows the system to adapt to an increase in the level of vibrations that may occur on account of aging of the vehicle and resultant deterioration in the engine and transmission systems. In contrast, with a non-adaptive control system, the efficiency of the system is liable to deteriorate with time and wear, or, alternatively, the empirical data must be updated.

An adaptive system is also preferable in some applications because the empirical data required for operation of such a control system will be obtained from a test group and the operational characteristics of some individual vehicles will inevitably deviate from those of the group. In addition, with the adaptive control system of this invention, not only is there no necessity for collection of data, the same control system can be fitted in exactly the same manner into a range of vehicles without a requirement for the collection of additional empirical data.

The adaptive control system of the present invention provides a clutch control system for a continuously variable transmission system having an engine, a belt and sheave system, and a slippable start clutch disposed between the engine and the belt and sheave system. The clutch control system regulates the torque transferred by the clutch from the engine to the felt and sheave system. The system includes means for determining the actual torsional vibrations experienced by the belt and sheave system. A signal representative of the actual torsional vibration is then compared with a signal representative of the level of torsional vibration that is set as an acceptable level. If the actual level is greater than the acceptable level, the clutch is allowed to slip by the amount necessary to reduce the torsional vibrations to the acceptable level.

A feedback loop providing information relating to actual clutch slip can be employed to ensure that the clutch is slipping by the required amount. The feedback loop includes means to measure the rotational speed of the clutch input shaft and the rotational speed of the clutch output shaft. The difference in rotational speed across the clutch determines the amount of clutch slip. Sufficient slip is ensured by increasing the clutch slippage in increments until the torsionals are reduced to the acceptable level. The clutch may be locked up when the torsionals are sufficiently reduced for more efficient operation of the transmission.

BRIEF DESCRIPTION OF THE DRAWINGS

For a more complete understanding of this invention, reference should now be made to the embodiment illustrated in greater detail in the accompanying drawings and described by example only. In the drawings.

DETAILED DESCRIPTION OF THE DRAWINGS

Figure 1:
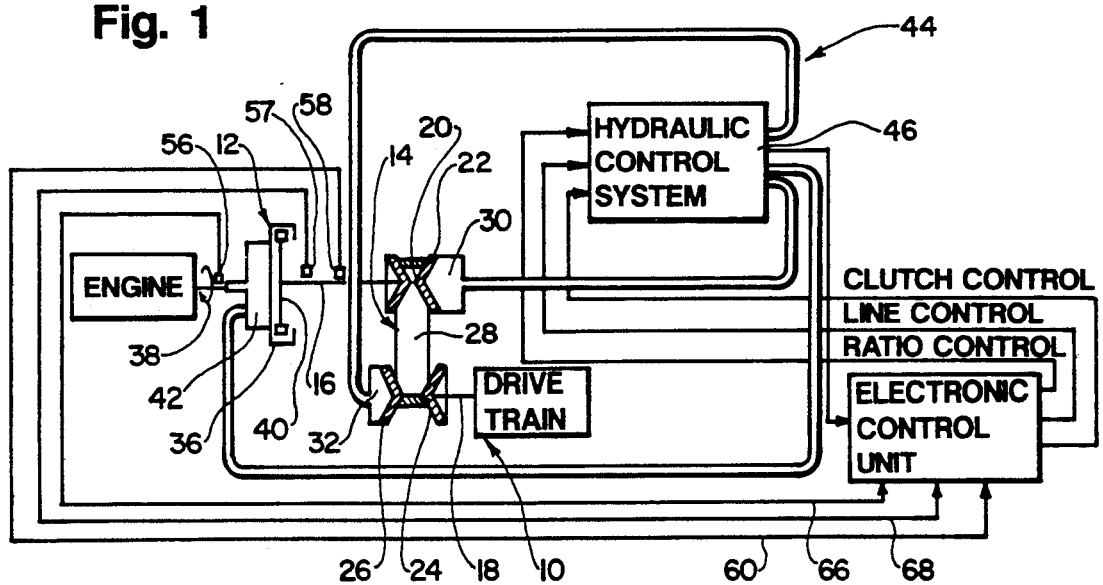
FIG. 1 is a schematic representation of the continuously variable transmission and associated control system of this invention; and, FIG. 2 is a schematic representation of the control system of this invention.

Turning to FIG. 1, a continuously variable transmission (CVT) generally designated at 10 can be seen having a slippable start clutch 12 located upstream of a belt and sheave system 14. The continuously variable transmission has an input shaft 16 and an output shaft 18. A first variable pulley 20 having a first movable sheave 22 is disposed on the input shaft 16. A second variable pulley 24 having a second movable sheave 26 is disposed on the output shaft 18. The first and second pulleys 20 and 24 are coupled by a flexible belt 28 of metal or elastomeric material. A first servo chamber 30 provides fluid to control movement of the first movable sheave 22 and a second servo chamber 32 provides fluid to control movement of the second movable sheave 26.

The operating ratio across the belt and clamping force on the belt of the continuously variable transmission 10 is determined by the pressure of fluid supplied to the first and second servo chambers 30, 32. The pressure in the first servo chamber 30 moves the first movable sheave 22 to regulate the ratio between sheaves and the resulting ratio between the input shaft 16 and the output shaft 18. The pressure supplied to the second servo chamber 32 varies the hydraulic pressure on the second movable sheave 26 and thereby varies the clamping force on the belt 28 to prevent belt slippage.

The slippable start clutch 12 is located on the transmission input shaft 16. The clutch 12 includes a housing 36 fixed for rotation with an engine output shaft 38 and a movable clutch plate 40 fixed for rotation with the transmission input shaft 16. The degree of slip between the engine output shaft 38 and the transmission input shaft 16 is regulated by the pressure of the fluid in a clutch servo chamber 42. Regulation of the clutch slip may be used during engine start up to regulate the increase in torque delivered to the transmission. Generally, after completion of start-up, the start clutch is locked up permanently and damping is achieved through one or more mechanical dampers. In this invention, however, selective slippage of the clutch is permitted during drive in order to reduce the torsional vibrations experienced at the transmission input shaft.

Figure 2:
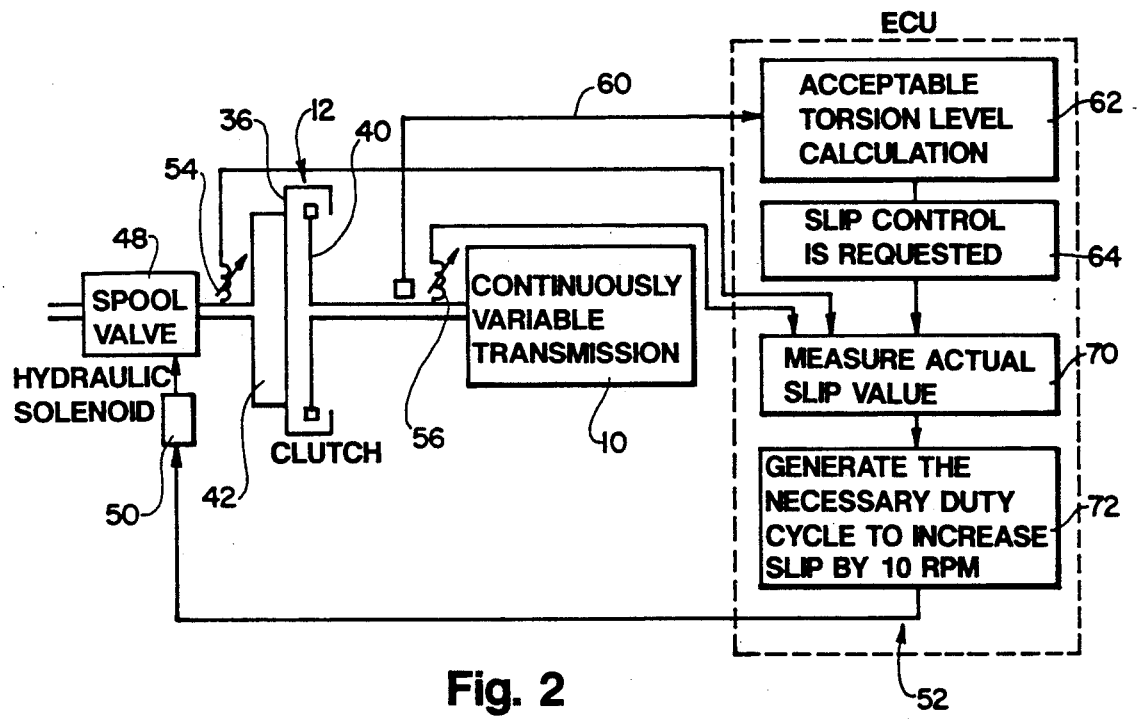

The pressure of the fluid in the clutch servo chamber 42 is controlled by a hydraulic circuit 44 that provides fluid to the clutch servo chamber 42. The hydraulic circuit is regulated by a control system 46 which is shown in more detail in FIG. 2. The hydraulic circuit 44 includes a spool valve 48 that regulates the fluid pressure in the clutch servo chamber 42, a hydraulic solenoid 50 that regulates the pressure of fluid allowed through the spool valve 48, and an electronic control unit (ECU) 52 that provides the duty cycle for control of the hydraulic solenoid 50 in response to varying engine conditions.

The actual slip of the start clutch is monitored using a first transducer 56 located on the engine output shaft 38 for measuring the clutch input speed and a second transducer 57 located on the transmission input shaft 16 for measuring the clutch output speed. The torsional vibrations on the transmission input shaft are monitored by a torsion graph 58. This device provides a signal to the ECU 52 representative of the level of torsional vibration on the transmission input shaft. The torsho graph 58 could be replaced by any commercially available torsion vibration measuring device.

Torsion vibration measuring devices generally operate by creating a carrier frequency that represents a constant rotation speed of a shaft or other rotating object. Any deviation from the carrier frequency is representative of the torsional vibrations of the shaft and can be measured or displayed as desired. By using such a device on the input shaft 16, the torsional vibrations on a shaft can be nearly instantaneously determined and apparatus can be used to eliminate the excess vibrations if they exceed a predetermined threshold value set within the control system 34.

The ECU 52 receives a signal from the torsho graph 58 on a line 60. The signal is sampled at predetermined intervals and delivered to a block 62 where an acceptable torsion level calculation is performed. The actual torsion level is compared with an upper limit for acceptable vibrations stored within the ECU 52 at each sampling. If the actual level of torsional vibration exceeds the upper acceptable limit, slip control is requested at block 64. A signal is delivered to block 72, where the duty cycle that controls the hydraulic solenoid 50 is generated. When slip control is requested at block 64, the duty cycle generated provides for a decrease in clutch pressure that corresponds to an incremental increase in clutch slip. Such an incremental increase can be on the order of, for example, 10 rpm. The period between successive samplings is preferably greater than the time lapse between generation of the sampled signal and the corresponding modification in clutch slip.

The ECU 52 also receives signals from the first and second transducers 54, 56 that provide signals representative of the clutch input and the clutch output speeds on lines 66 and 68, respectively. The actual clutch slip is calculated at block 70 and is used in feedback control of the clutch pressure. The control system could be operated without the feedback loop. It is, however, preferable to include a feedback control to guard against variations in response by the clutch mechanism.

If after a single incremental increase in clutch slip, the vibrations are still above the acceptable level on the clutch output shaft, the vibrations registered by the torsho graph 58 at the next sampling will also still exceed the acceptable level. Slip control will be requested once more at block 64 and the duty cycle regulated to provide a further incremental increase in clutch slip. This series of steps is repeated and the clutch slip is incrementally increased, until the torsional vibration level sampled is below the set acceptable value. At this time, slip control is no longer requested at block 64 with a corresponding absence of further increase in clutch slip.

It is important to the efficient operation of the transmission that the clutch is locked up as soon as possible after the drive condition of excessive torsional vibration is passed. This can be achieved in a number of ways including, for example, a time lapse arrangement which can periodically lock up the clutch to determine whether the vibrations are still in evidence. If the clutch is locked-up and torsional vibrations still exist at unacceptable levels, a signal will immediately be developed by block 64 initiating slip control. The clutch will again slip by increasing amounts until the vibrations are reduced to the acceptable level. After the predetermined time lapse, the clutch can again be locked up to redetermine whether or not the vibrations are at or below the set acceptable level.

An alternative arrangement to ensure the clutch is locked-up whenever possible can include a second torsion vibration detector positioned on the input shaft to the clutch to determine when vibrations on the input shaft have reduced by a significant amount or perhaps to a level below that at which slip control was first requested.

In order to ensure that the engine always operates at or above a threshold level of efficiency, a further limitation can be imposed on the control system. This limitation would prevent the slip across the clutch being increased beyond a threshold value. If the actual slip exceeds a predetermined value stored within the ECU, the slip control request signal from block 64 will be cancelled and no further slippage permitted. The duty cycle will then maintain the clutch slip at its maximum permitted level. The limiting value may be a difference in rate of revolution between the clutch input shaft and the clutch output shaft of around 100 rpm.

The adaptive nature of the control system of this invention allows damping of torsional vibrations from either internal or external sources. Instead of requiring extensive testing of a prototype vehicle in order to derive the operating characteristics during operation, the torsional vibrations of an engine are monitored at all times and corrective action taken through clutch slippage to maintain vibrations at a desirable level.

One advantage of this adaptive system is its ability to remove vibrations that originate from areas unforeseen during the collection of empirical data. Preprogrammed systems provide a limited number of parameters that are monitored and can therefore be incorporated into a control system. As a result, only vibrations that correspond to specific values of the measured parameters or interpolations therebetween can be countered by the control system. Any peculiarities of a particular engine that result in vibrations in addition to those experienced in the test group will therefore not be counteracted. Vibrations that increase due to the age of a transmission will also not be damped.

By providing an adaptive system that controls the slippage of a start clutch to reduce torsional vibrations in response to the actual vibrations experienced on the input shaft of the belt and sheave system, torsional vibrations caused as a result of many different conditions can be damped. By introducing an increment in slip in response to vibrations, only a limited amount of stored data is necessary to determine the amount of clutch slip necessary to reduce the torsional vibrations to a desired level. Storage space is therefore reserved for data necessary to the control of other parts of the hydraulic control system. The adaptive control system of this invention thereby provides for an efficient and effective way of using a slippable start clutch as a torsional isolator.

While the preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings.

What is claimed is:

1. A clutch control system for a continuously variable transmission having a torque input means, a torque output means, a belt and sheave system and a slippable start clutch means for transmitting torque to said belt and sheave system, said slippable start clutch means being operatively located between said torque input means and said belt and sheave system, said control system comprising:

means for providing a first value representative of a limiting value of torsional vibrations transmitted to said belt and sheave system;

means for providing a first signal representative of actual torsional vibrations transmitted to said belt and sheave system;

means for comparing said first signal with said first value;

clutch slip feedback means for providing a second signal representative of the actual slip across said start clutch; and clutch adjustment means for modifying slip across said slippable start clutch means in an incremental amount, said clutch adjustment means responsive to said comparing means and said clutch slip feedback means to reduce torsional vibrations.

2. The clutch control system of claim 1 wherein said means for providing a first signal comprises a torsional vibration director located on an output shaft of said slippable start clutch means.

3. The control system of claim 1 wherein said means for providing a first signal comprises means for discrete time interval sampling of the level of torsional vibrations on an output shaft of said slippable start clutch means.

4. The control system of claim 3 wherein a first time period lapses between a first sampling of the level of torsional vibrations on said clutch output shaft and the corresponding activation of said modifying means for modification of the slip across said slippable clutch means.

5. The control system of claim 4 wherein a second time period lapses between said first sampling and a second sampling of the level of torsional vibrations, said first time period being of greater length than said second time period.

6. The control system for claim 1 wherein said clutch adjustment means includes means for providing a clutch control signal in response to a torsional vibration level in excess of said first limiting value.

7. The control system of claim 6 wherein said clutch adjustment means further comprises means for increasing clutch slip by a predetermined incremental amount in response to said clutch control signal.

8. The control system of claim 7 wherein said predetermined incremental amount corresponds to an increase in slip across the start clutch of around 10 rpm.

9. A clutch control system for a continuously variable transmission having a torque input means, a torque output means, a belt and sheave system and a slippage start clutch means, for transmitting torque to said belt and sheave system, said slippable start clutch means operatively positioned between said torque input means and said belt and sheave system, said control system comprising:
   means for providing a first value representative of a limiting value of torsional vibrations transmitted to said belt and sheave system;
   means for providing a first signal representative of actual torsional vibrations transmitted to said belt and sheave system;
   means for comparing said first signal with said first value;
   clutch slip feedback means for providing a second signal representative of the actual slip across said start clutch;
   means for developing a clutch control signal in response to said comparing means determination that said first signal value exceeds said first value; and
   clutch adjustment means for modifying the slip across said start clutch to increase clutch slip by an incremental amount, said clutch adjustment means responsive to said comparing means and said clutch slip feedback means to reduce torsional vibrations;
   lock-up means for fully engaging said slippable start clutch.
   said lock-up means being activated to fully engage said slippable start clutch irrespective of the magnitude of said first signal.

10. The system of claim 9 wherein said lock-up means comprises:
    means for periodically providing an engagement signal to said slippable start clutch to fully engage said slippable clutch; and
    means for partially releasing said slippable clutch;
    said means for partially releasing said slippable clutch being active to periodically decrease the degree of engagement of said slippable start clutch until said first signal no longer exceeds said first value.

11. The system of claim 9 wherein said lock-up means comprises:
    means for providing a second value representative of actual torsional vibrations transmitted on said torque input means;
    means for providing a torque input vibration signal representative of actual torsional vibrations transmitted on said torque input means;
    means for comparing said torque input vibration signal and said second value; and
    said clutch adjustment means being responsive to said comparing means to fully engage said slippable clutch.

* * * * *

UNITED STATES PATENT AND TRADEMARK OFFICE
CERTIFICATE OF CORRECTION

PATENT NO. : 5,064,036
DATED : November 12, 1991
INVENTOR(S) : Karl F. Schneider It is certified that error appears in the above-indentified patent and that said Letters Patent is hereby corrected as shown below:

On the title page, item [54] and column 1, line 2, delete "TORIONAL" and substitute --TORSIONAL--.

In column 3, line 9, delete "felt" and substitute --belt--.

In column 3, line 36, after "by" insert --way of--.

In column 4, line 37, delete "torsion" and insert --torsho--.

UNITED STATES PATENT AND TRADEMARK OFFICE
CERTIFICATE OF CORRECTION

PATENT NO. : 5,064,036
DATED : November 12, 1991
INVENTOR(S) : Karl F. Schneider It is certified that error appears in the above-indentified patent and that said Letters Patent is hereby corrected as shown below:

In claim 2, line 3, delete "director" and insert --detector--,

In claim 9, line 29, delete "." and insert --;--.

Signed and Sealed this

Nineteenth Day of March, 1996

Attest:

BRUCE LEHMAN

*Attesting Officer*  *Commissioner of Patents and Trademarks*